(12) United States Patent
Yamashita et al.

(10) Patent No.: US 8,735,486 B2
(45) Date of Patent: May 27, 2014

(54) FLAME-RETARDANT RESIN COMPOSITION, PROCESS FOR PRODUCING THE SAME, METHOD OF MOLDING THE SAME

(75) Inventors: Takehiko Yamashita, Hyogo (JP); Kunihiko Takeda, Aichi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/005,193

(22) Filed: Jan. 12, 2011

(65) Prior Publication Data

US 2011/0101566 A1     May 5, 2011

Related U.S. Application Data

(62) Division of application No. 11/791,174, filed as application No. PCT/JP2005/020719 on Nov. 11, 2005.

(30) Foreign Application Priority Data

Nov. 19, 2004    (JP) ................................. 2004-336012

(51) Int. Cl.
     *C08K 3/22*        (2006.01)

(52) U.S. Cl.
     USPC .......................................................... 524/492

(58) Field of Classification Search
     USPC ................................................... 524/77, 492
     See application file for complete search history.

(56) References Cited

U.S. PATENT DOCUMENTS

| | | | |
|---|---|---|---|
| 1,963,245 A | 6/1934 | Pier | |
| 2,470,410 A | 5/1949 | Nelson | |
| 3,050,472 A * | 8/1962 | Morrell | .......................... 502/214 |
| 3,345,319 A | 10/1967 | Colgan et al. | |
| 4,317,742 A | 3/1982 | Yamaji et al. | |
| 4,339,555 A | 7/1982 | Ohmura et al. | |
| 4,525,529 A | 6/1985 | Ohmura et al. | |
| 5,011,893 A | 4/1991 | Miyamoto et al. | |

(Continued)

FOREIGN PATENT DOCUMENTS

| | | |
|---|---|---|
| CN | 1107486 A | 8/1995 |
| EP | 1 213 111 A2 | 6/2002 |

(Continued)

OTHER PUBLICATIONS

Analysis and Characterization of High-Purity Talc for Use in Propellants: Determination of Talc in Propellants. Dec. 1975.*

(Continued)

*Primary Examiner* — John Uselding
(74) *Attorney, Agent, or Firm* — McDermott Will & Emery LLP

(57) ABSTRACT

An exterior body of an electric appliance is produced by kneading one or more resin components and one or more flame retardancy-imparting components to give a composition, and molding the composition by an injection molding method or a compression molding method. At least one of the flame retardancy-imparting components is a catalytic cracking catalyst and the catalytic cracking catalyst is a silica-magnesia catalyst which is double oxide of silicon oxide and magnesium oxide or which is formed by binding silicon oxide and magnesium oxide. The at least one flame retardancy-imparting component is contained in an amount of 0.5 wt % to 40 wt % of the resin composition. No metal hydroxide and no polyvinyl chloride are contained in the composition.

2 Claims, 1 Drawing Sheet

(56) References Cited

U.S. PATENT DOCUMENTS

| | | | |
|---|---|---|---|
| 5,153,269 A | 10/1992 | Greenlee et al. | |
| 5,180,787 A | 1/1993 | Shorr et al. | |
| 5,219,921 A | 6/1993 | Gomyo | |
| 5,883,222 A * | 3/1999 | Yanagisawa et al. | 528/361 |
| 6,368,586 B1 | 4/2002 | Jacob et al. | |
| 6,432,869 B1 | 8/2002 | Krause et al. | |
| 6,960,626 B2 | 11/2005 | Takekoshi et al. | |
| 2001/0003761 A1 | 6/2001 | Ishibashi et al. | |
| 2001/0024354 A1 | 9/2001 | Mori et al. | |
| 2002/0128344 A1 | 9/2002 | Fujihira et al. | |
| 2002/0132951 A1 | 9/2002 | Ibaragi et al. | |
| 2002/0138154 A1 | 9/2002 | Li et al. | |
| 2003/0056966 A1 | 3/2003 | Mori et al. | |
| 2003/0216496 A1 | 11/2003 | Mohanty et al. | |
| 2004/0034121 A1 * | 2/2004 | Nozaki et al. | 523/124 |
| 2004/0242803 A1 | 12/2004 | Ohme et al. | |
| 2006/0100313 A1 | 5/2006 | Tanaka et al. | |
| 2006/0142421 A1 | 6/2006 | Ihara et al. | |
| 2006/0194899 A1 | 8/2006 | Ohashi et al. | |
| 2008/0071015 A1 | 3/2008 | Kiuchi et al. | |
| 2008/0108742 A1 | 5/2008 | Miyamoto et al. | |
| 2008/0194739 A1 | 8/2008 | Yamashita et al. | |
| 2009/0311511 A1 | 12/2009 | Obuchi et al. | |
| 2010/0066217 A1 | 3/2010 | Fujikawa et al. | |
| 2010/0207497 A1 | 8/2010 | Kawasaki | |
| 2011/0101566 A1 | 5/2011 | Yamashita et al. | |
| 2011/0263762 A1 | 10/2011 | Matsuno et al. | |

FOREIGN PATENT DOCUMENTS

| | | |
|---|---|---|
| EP | 1 609 820 A1 | 12/2005 |
| JP | 5-17124 A | 1/1993 |
| JP | 11-302424 | 11/1999 |
| JP | 2001-152030 A | 6/2001 |
| JP | 2001-244645 A | 9/2001 |
| JP | 2001-329110 | 11/2001 |
| JP | 2002-173583 A | 6/2002 |
| JP | 2003-054990 | 2/2003 |
| JP | 2003-292796 A | 10/2003 |
| JP | 2004-277706 A | 10/2004 |
| JP | 2007-056088 A | 3/2007 |
| JP | 2007077368 A | 3/2007 |
| JP | 2007-154002 A | 6/2007 |
| JP | 2007-230851 A | 9/2007 |
| JP | 2009-173803 A | 8/2009 |
| JP | 2010-209313 A | 9/2010 |
| JP | 2010-209321 A | 9/2010 |
| KR | 2004-039681 | 5/2004 |
| WO | 2004/022650 A1 | 3/2004 |
| WO | WO 2004/090034 A1 | 10/2004 |
| WO | 2006/054493 A1 | 5/2006 |
| WO | 2010053167 A1 | 5/2010 |

OTHER PUBLICATIONS

Serizawa et al., "Development of Kenaf Fiber Reinforced Poly (Lactic Acid) (PLA)," The 14th annual meeting of Japan Society of Polymer Processing, pp. 161-162, 2003.

European Search Report issued in European Patent Application No. EP 05 805 898.3 dated Aug. 17, 2009.

Derwent—ACC-No. 2004-631917. 2004.

United States Office Action issued in U.S. Appl. No. 11/791,174, mailed Feb. 15, 2011.

European Search Report issued in European Patent Application No. 10188452.6-2102, dated May 6, 2011.

United States Office Action issued in U.S. Appl. No. 11/791,174, mailed May 18, 2011.

US Office Action issued in U.S. Appl. No. 11/791,174 dated Jan. 27, 2012.

Chinese Office Action, and English translation thereof, issued in Chinese Patent Application No. 201110042079.0 dated Jun. 6, 2012.

United States Office Action issued in U.S. Appl. No. 13/649,804 mailed Jun. 20, 2013.

Notification of Transmittal of Translation of the International Preliminary Report on Patentability (Chapter I or Chapter II) (PCT/IB/338) issued in International Application No. PCT/JP2011/004906 mailed Sep. 12, 2013.

International Search Report issued in corresponding International Application No. PCT/JP2011/004906 with Full English Translation mailed Dec. 13, 2011.

Notification of Transmittal of Translation of the International Preliminary Report on Patentability (Chapter I or Chapter II) (PCT/IB/338) issued in International Application No. PCT/JP2011/004907 mailed Sep. 6, 2013.

International Search Report issued in corresponding International Applicaiton No. PCT/JP2011/004907 with Full English Translation mailed Dec. 13, 2011.

United States Office Action issued in U.S. Appl. No. 13/780,699 mailed Jul. 12, 2013.

International Search Report issued in International Patent Applicaiton No. PCT/JP2012/002865 mailed Jun. 26, 2012.

Papazoglou, E. Chapter 4: Flame Retardants for Plastics, Handbook of Building Materials and Fire Protection, 2004, McGraw-Hill Professional, 1st Edition, pp. 4.1 to 4.88.

Definition of molecule. The Free Dictionary. http://www.thefreedictionary.com/molecule. As reviewed on Jun. 25, 2013.

International Search Report issued in International Application No. PCT/JP2012/004626 mailed Oct. 23, 2012.

United Statesd Office Action issued in U.S. Appl. No. 13/781,700 mailed Jul. 17, 2013.

* cited by examiner

FLAME-RETARDANT RESIN COMPOSITION, PROCESS FOR PRODUCING THE SAME, METHOD OF MOLDING THE SAME

RELATED APPLICATIONS

This application is a Divisional of U.S. patent application Ser. No. 11/791,174, filed on Oct. 26, 2007, which is a U.S. National Phase under 35 U.S.C. §371 of International Application No. PCT/JP2005/020719, filed on Nov. 11, 2005, which in turn claims the benefit of Japanese Application No. 2004-336012, filed on Nov. 19, 2004, the disclosures of which applications are incorporated by reference herein.

BACKGROUND OF THE INVENTION

The present invention is related to a resin composition to which flame retardancy is conferred, particularly a resin composition containing a biodegradable resin and/or a resin whose material is plant resource, or a polystyrene resin, and a method for producing the resin composition, and a method for molding the resin composition.

Recently, attention is paid to a resin (or plastic) which is degraded by a bacterial action when it is buried in the ground. The resin which is referred to as a biodegradable resin (or a biodegradable plastic) has a characteristic of being degraded under the presence of aerobic bacterial into water ($H_2O$) and carbon dioxide ($CO_2$). The biodegradable resin has been put to practical use in an agricultural field, and has been practically applied as a packaging material of a disposable article and a compostable garbage bag.

When the biodegradable resin is subjected to waste disposal by utilizing its characteristic of being degraded with the bacteria in the ground, it is possible to significantly reduce emission of $CO_2$ compared with conventional incineration. Therefore, attention is paid to the use of the biodegradable resin from the view point of the prevention of global warming. The article wherein the biodegradable resin is used may be advantageous to the user because it is unnecessary to collect a used plastic when the article is used in the agricultural field. For these reasons, the market of the biodegradable resin is expanding.

Further, attention has been recently paid to also a plant-based (or plant-derived) resin in the fields of electronics and automobile. The plant-based resin is obtained by polymerizing or copolymerizing monomers which are obtained from plant materials. The plant-based resin draws attention as an environment-friendly resin because it is produced without relying on petroleum resources, the plant which is a material for the resin grows absorbing carbon dioxide, and a burned calorie and a $CO_2$ emission are small when it is disposed of with an incinerator. The plant-based resin generally has biodegradability. The plant-based resin, however, does not necessarily need to have biodegradability only from the viewpoint of the prevention of depletion of petroleum resources. In other words, resins which contribute to environmental protection include the plant-based resins which do not have biodegradability, in addition to the biodegradable resins. For this reason, in the specification including the following description, a term "environmental resin" is used for the sake of convenience in order to give a generic name to the biodegradable resins (including petroleum-based ones and the plant-based ones) and the plant-based resins which do not have the biodegradability.

The environmental resins which are now used are classified roughly into three types, a polylactic acid-based resin (hereinafter, it is abbreviated as a "PLA"), a PBS-based resin (a copolymer resin of 1,4-butanediol and succinic acid), and a PET-based resin (modified polyethylene terephthalate). The characteristics of each resin are shown in Table 1.

TABLE 1

| | PLA (Polylactic acid) | PBS (Polybutylene succinate) | PET-based (Modified polyethylene terephthalate) |
|---|---|---|---|
| Biodegradability | ◎ | ◎ | ○ |
| Material | Plant | Petrochemical feedstocks | Petrochemical feedstocks |
| | | A synthesize method with a plant material is reported. | |

Among these resins, the PLA corresponds to the plant-based resin. The PLA can be produced by a chemical synthesis by using, as a material, sugar made by plant such as corn or sweet potato, and there is a possibility of industrial production of the PLA. Such a plastic containing the plant-based resin is also referred to as a bio plastic. Particularly the PLA draws attention since mass production thereof has been started using corn as a material. It is desired that a technique of applying the PLA not only to a use which requires biodegradability, but also to a wide variety of uses is developed.

It is, however, necessary to improve the characteristics of these environmental resins for substituting them for existing materials. The physical properties of polystyrene (PS) and an acrylonitrile-butadiene-styrene resin (hereinafter, it is abbreviated as "ABS") which are general resins and the physical properties of polylactic acid (PLA) and polybutylene succinate (PBS) which are the environmental resins are shown in Table 2. A "bending modulus" and a "bending strength" represent rigidity. As these values are higher, the rigidity is higher. An "izod impact strength" represents a fracture energy when a test piece is subjected to an impact load to be broken. As the value of the "izod impact strength" is larger, the piece is more difficult to be broken when impact is applied. The "heat deformation temperature" is a temperature at which the resin starts to deform. As the value of the "heat deformation temperature" is higher, it is possible to use the resin under a higher-temperature condition.

TABLE 2

| | General resin | | Environmental resin | |
|---|---|---|---|---|
| Resin | PS | ABS | PLA | PBS |
| Bending modulus | 2250 | 2100 | 4500 | 1950 |
| Bending strength | 47 | 70 | 132 | 55 |
| Izod impact strength | 80 | 200 | 46 | ND |
| Heat deformation temperature | 80 | 96-100 | 66 | 97 |

From this table, it is found that PLA is hard and fragile, and that PBS is soft. Further, it is found that PLA is poor in heat durability and that PBS has higher heat durability than ABS, as a result of comparison of the thermal characteristic.

A method which involves blending of another component has been proposed for improving the characteristics of these environmental resins. For example, it is proposed that a synthesized mica of about 0.5-20 wt % is blended with the PLA for the purpose of improving the heat resistance of PLA in Japanese Patent Kokai (Laid-Open) Publication No. 2002-173583(A) (Patent Literature 1). In the Japanese Patent Kokai (Laid-Open) Publication No. 2002-173583(A), it is proposed that an additive inhibiting hydrolysis of the biodegradable resin (that is, the biodegrading action), for example, a carbodiimide compound is blended.

Further, it is reported that there is a possibility of applying PLA to an exterior body of a personal computer when kenaf is blended with PLA (see Serizawa et al. "Development of polylactic acid reinforced by kenaf", The 14th annual meeting of Japan Society of Polymer Processing pre-print materials, pp 161-162, 2003 (Non-patent Literature 1). Specifically, it is reported that the heat resistance of the PLA resin is improved by adding an annealing process after molding the PLA resin wherein kenaf is blended, so that there is a higher possibility of applying the PLA to the exterior body of the personal computer.

On the other hand, a polystyrene (PS) resin which is not the environmental resin, has good balance between physical properties and cost and it is widely used in products in various fields, such as containers and packaging, building material, sundry goods, electric equipment and electronic equipment, fiber, paint and adhesive, automobile, and precision mechanical equipment. The total used amount of polystyrene is also large, and polystyrene is one of five general-purpose resins, along with vinyl chloride, polyethylene (PE), polypropylene (PP), and polyethylene terephthalate (PET). Therefore, it would be still necessary to use the polystyrene resin while developing the environmental resin. Not a conventional PS resin but a high impact polystyrene (HIPS) which is obtained by blending a butadiene rubber with PS is mainly used in consumer durable goods such as electric and electronic products, building material, and automobile among the above-mentioned applications. HIPS is further improved in impact resistance compared to PS and used for constituting parts or members, such as exterior bodies of various products which are used for a relatively long period.

Patent Literature 1: Japanese Patent Kokai (Laid-Open) Publication No. 2002-173583(A)

Non-patent Literature 1: Serizawa et al. "Development of polylactic acid reinforced by kenaf", The 14th annual meeting of Japan Society of Polymer Processing pre-print materials, pp 161-162, 2003

DISCLOSURE OF INVENTION

Problems to be Solved by Invention

The resin composition mentioned in the above Patent Literature 1 and Non-patent Literature 1 are suggested for improving the heat resistance and these documents do not mention the impartment of flame retardancy which is essential for applying the resin composition to the exterior body of electric home appliance. In actual, the resin compositions mentioned in the above documents do not have flame retardancy. Therefore, the PLA composition which has been proposed cannot be applied to the exterior body of the electric appliance such as a television set which has a high-voltage part in the interior thereof. Further, safety is recently weighed on the electric appliance and the flame-retardant resin tends to be employed even in equipment which does not have a high-voltage element. Therefore, the utility of the environmental resin is very low unless it acquires flame retardancy, even if it has sufficient properties as to the rigidity, the impact strength and the heat resistance.

On the other hand, the HIPS resin which is one of the PS resins, has been used in an electric appliance with a high-voltage circuit in the interior thereof, such as a television set, and have much of a record of actual use. The flame retardation of HIPS may be made by blending a halogen-based flame retarder and an auxiliary agent for flame retarder with HIPS, and these flame retarder and auxiliary agent for flame retarder allow the HIPS to have high flame retardancy. The use of specific halogen-based flame retarders, however, is now being prohibited in Europe since there is a concern that the resin containing the halogen-based flame retarder may generate dioxin when it is disposed and incinerated.

The use of the halogen-based flame retarder is being prohibited not only for the PS resin, but also for other general-purpose resins. For this reason, non-halogen-based flame retarder which confers high frame retardancy to the resin is required and being developed.

A phosphorus-based flame retarder is known as the non-halogen-based flame retardant. The phosphors-based flame retarder shows high flame retardancy to some extent, but it is required to be mixed with the resin at a high mixing ratio so as to achieve the same flame retadancy as that of the halogen-based flame retardant. For this reason, the resin composition which contains the phosphorus-based flame retarder tends to be inferior in mechanical properties.

A mechanism for flame retardation given by the conventional flame retarder is described. Any of the flame retardants is contained at a predetermined ratio in the resin which is to have flame retardancy. The mechanism for flame retardation depends on the flame retardant. For example, the halogen-based flame retarder as represented by a bromine-based flame retarder suppresses a burning reaction when a halogen-based gas component generated by a thermal decomposition traps radicals emitted from the resin in a gaseous phase and thereby suppresses a burning reaction. The phosphorus-based flame retarder facilitates to form a charred layer by burning and this charred layer block oxygen and radiation heat, whereby it is considered that burning is suppressed. The metal hydroxide-based flame retarder employs a mechanism for flame retardation obtained by merely blending a large amount of nonflammable substance, and such a flame retarder is required to be mixed in large quantity. The mixing ratio of the flame retarder depends on the required flame retardancy and it may be over 50 wt %. When the mixing ratio is over 50 wt %, the flame retarder exists in larger amount than the resin component in the resin composition. It is hard to call such resin composition a "resin" since the physical properties of the composition are quite different from those of a resin containing no flame retardant. Therefore, it is required to develop a flame retardation which shows a mechanism for flame retardancy such that high flame retardation is achieved by blending a small amount of flame retarder with the resin.

The present invention is made in the light of these situations. The object of the present invention is to provide a resin composition which is useful for an exterior body of, for example, an electric appliance, by adding a non-halogen-based flame-retardant component to an environmental resin, or a general-purpose resin such as PS and HIPS.

Means to Solve Problems

The inventors studied to achieve the object and found a catalyst which is used for purifying, cracking (or decomposing), synthesizing or reforming hydrocarbon can confer high flame retardancy to a resin (particularly an environmental resin and a PS resin), by being added as a flame retardancy-imparting component to the resin, even if the amount of the catalyst is not so large, whereby the present invention is made. In other words, the present invention provides a resin composition containing one or more resin components and one or more flame retardancy-imparting components, wherein at least one of the flame retardancy-imparting components is selected from a catalyst for purifying hydrocarbon, a catalyst for cracking hydrocarbon, a catalyst for synthesizing hydrocarbon, and a catalyst for reforming hydrocarbon.

In this specification, a term "resin" is used for referring to a polymer in the resin composition, and a term "resin composition" is used for referring to a composition containing at least the resin. A term "plastic" is used for referring to a substance which contains the polymer as an essential component. The resin composition of the present invention can be called as plastic since it contains the resin component and the flame retardancy-imparting component.

"Flame retardancy" means property of not continuing combustion or not generating afterglow after removing an ignition source. The "flame retardancy-imparting component" includes a flame-retardant component which makes the resin to be flame-retarded one when the component is added to the resin (such component may be called as a "flame retarder"), and an auxiliary agent for flame retarder which cannot make the resin to be flame-retarded one alone, but enhances the effect of improving flame retardancy exerted by the flame-retardant component, when the agent is added together with the flame-retardant component. Thus, the "flame retardancy-imparting component" generically refers to components which contribute to improvement of flame retardancy of the resin. The frame retardancy-imparting component employed in the present invention is a catalyst used for purifying, cracking, synthesizing and/or reforming hydrocarbon, and is a form of compound that contains no halogen or is difficult to generate dioxin. A term "and/or" is used assuming that one catalyst may be used in two or more processes, for example, both of cracking and reforming. These catalysts can act as the flame-retardant component alone, or act as the flame retarder or the auxiliary agent for flame retarder together with another flame-retardant component (that is, the flame retarder). In the resin composition of the present invention, the catalyst used as the flame retardancy-imparting agent is one or more catalysts selected from, for example, a catalytic cracking catalyst, an isomerizing catalyst, a dehydrogenation catalyst, a metal complex, a hydrocracking catalyst, a desulfurization catalyst, a denitration catalyst, a methanation catalyst, a sweetening catalyst, a hydrogenation catalyst, a chlorination catalyst, an oxidation catalyst, a catalyst for removing an organic substance, a polymerization catalyst, an alkylation catalyst, a dehalogenation catalyst, a conversion catalyst, a synthesis catalyst, a reforming catalyst, a catalyst for removing an organic compound, a catalyst for removing a nitrogen oxide, a deodorizing catalyst, an ozonolysis catalyst, a sulfur recovery catalyst, a catalyst for producing an inert gas, a catalyst for producing sulfuric acid, a catalyst for producing nitric acid, and a photocatalyst.

These catalysts serve to facilitate, for example the catalytic cracking of the hydrocarbon and so on, and have been employed in a chemical process to give an intended compound, or has been used for absorbing and decomposing a particular compound in a gas. These catalysts are often used under a reaction condition of a high temperature and/or a high pressure. Further, these catalysts are released outside the process as a waste catalyst after the reaction, not remaining in a desired reaction product. The present invention results from the finding that, when these catalysts are blended with the resin to be dispersed in the resin, they exert effect peculiar to the catalyst during a combustion reaction in an actual resin-burning process and considerably contribute to the flame retardation of the resin.

It is considered that these catalysts significantly contribute to the flame retardation of the resin by degrading the resin into molecules of low molecular weights so that a total molecular weight of combustible gases emitted by thermal decomposition. In other words, assuming that a polymer is broken a predetermined times, as the polymer is broken into molecules of lower molecular-weights, an amount of gases as a fuel is reduced by just that much and a combustion energy is lowered compared with the case where the polymer is broken into molecules of higher molecular-weights. As a result, the combustion energy in the burning field is reduced, and a radiant heat is lowered, whereby the thermal decomposition of the resin is suppressed. It is considered that, by repeating this, the combustion cycles cannot be continued, and the flame retardation of the resin is achieved.

In the resin composition of the present invention, the flame retardancy-imparting component is preferably silica-magnesia catalyst (which may be indicated as $MgO/SiO_2$ hereinafter). The silica-magnesia catalyst, is a solid acid catalyst and used as the catalytic cracking catalyst of the hydrocarbon. This catalyst is preferably used since it gives excellent flame retardancy particularly to a biodegradable resin and a plant-based resin, and a PS resin. Also a silica-alumina catalyst ($SiO_2/Al_2O_3$) which is used as the catalytic catalyst and $La_2O_3$ and CeO which are used as the dehydrogenation catalyst are preferably used since they impart excellent flame retardancy to the biodegradable resin and the plant-based resin and the PS resin.

In the resin composition of the present invention, at least one resin component is preferably at least one resin selected from the biodegradable resin and the plant-based resin. A more environmentally-friendly resin composition may be obtained by combining the biodegradable resin or the plant-based rein with the flame retardancy-imparting component selected from the above catalysts which are substantially non-halogen-based.

Here, the "biodegradable resin" means a resin which can be degraded into low-molecular-weight molecules with microorganism participation in nature after being used and finally degraded into water and oxygen. The "plant-based resin" means a resin which is obtained by polymerizing monomer obtained from plant material, or a resin which is obtained by copolymerization of the monomer and another monomer (that may not be obtained from the plant materials). The plant-based resins include one having the biodegradability and one not having the biodegradability. The plant-based resin which has the biodegradability may be classified as the "biodegradable resin" referred to herein. In this specification, these two kinds of resins are referred to in parallel in order to clarify that the biodegradable resin or the plant-based resin is used as the polymer component from the view point of the protection of environment.

The resin composition of the present invention preferably contains, as the resin component, polylactic acid (PLA), lactic acid copolymer, or polybutylene succinate (PBS), or a mixture thereof. Particularly polylactic acid is preferably contained as the resin component. As described above, it has been suggested that polylactic acid (PLA) is used, as a plant-based mass-producible resin, for a package of a home electric appliance. Therefore, the utility of the resin is further improved by imparting the flame retardancy to it with the catalyst which is substantially non-halogen.

Alternatively, in the resin composition of the present invention, at least one resin component may be preferably polystyrene (PS). The combination of polystyrene and the flame retardancy-imparting component selected from the catalysts which are substantially non-halogen makes it possible to provide the polystyrene with good mechanical properties and flame retardancy in a more environmentally-friendly form.

The present invention also provides a method for producing a flame-retardant resin composition which includes kneading at least one resin composition and at least one flame retardancy-imparting component. In this production method, the flame retardancy-imparting component selected from the above specific catalysts is added to the resin component in a kneading step wherein the resin is melted. The kneading step is an essential process when producing or molding plastics. Therefore, another step of blending the flame retardancy-imparting component is not required in this production method, and the flame-retardant resin composition may be obtained without raising the production cost so much.

This production method may be applied to any of the case where the resin component is the biodegradable resin or the plant-based resin, and the case where the resin component is polystyrene. Therefore, this production method is advantageous in that the flame-retardant environmental resin can be obtained using the plastic production method which is conventionally carried out, when the resin component is the biodegradable or the plant-based resin.

Further, the present invention provides a method for molding a flame-retardant resin composition which method includes molding a composition which is obtained by kneading at least one resin component and at least one flame retardancy-imparting component according to an injection molding method or a compression molding method. That is, the flame-retardant resin composition may be molded according to a conventional method without substantially changing a conventional production apparatus for a plastic molded article.

This molding method may be applied to any of the case where the resin component is the biodegradable resin or the plant-based resin, and the case where the resin component is polystyrene. Therefore, when the biodegradable plastic or the plant-based plastic is used as the resin component, switching of material from a thermoplastic plastic to the biodegradable plastic or the plant-based plastic can be easily made. Further, the resin composition of the present invention containing PS as the resin component may be molded using a conventional apparatus for molding PS as is.

Effect of Invention

The present invention makes it possible to confer the flame retardancy using the catalyst which is the non-halogen-based flame retardancy-imparting component, to the biodegradable resin and the plant-based resin which are environmentally-friendly, and PS which is widely used in various articles, without increasing production steps. Further, the resin composition of the present invention may be a very earth-conscious material since the composition generates no or small amount of harmful substances even if it is incinerated. Furthermore, since the resin composition of the present invention has high flame retardancy and can be used as the exterior body of the electric appliance, it has high industrial value and is useful.

BEST MODE FOR CARRYING OUT THE INVENTION

Figure 1:
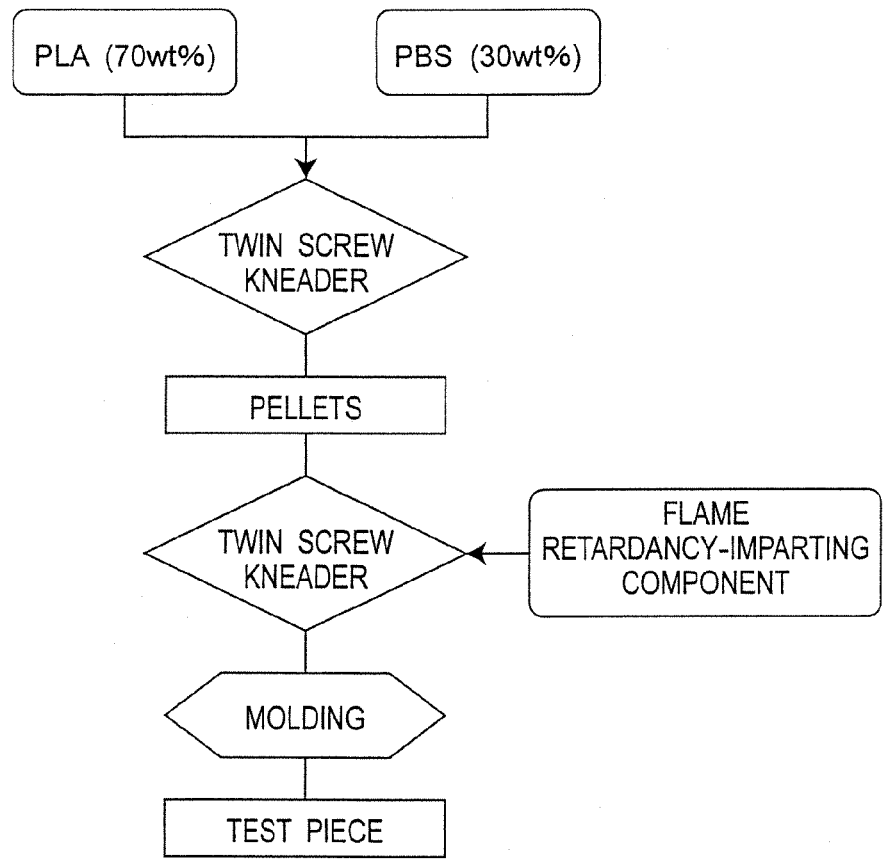
FIG. 1 is a flow chart showing a method for producing a flame-retardant resin composition of the present invention.

As described above, the flame-retardant resin composition contains one or more resins as a resin component, and one or more flame retardancy-imparting components which are selected from particular catalysts. Firstly, the resin component is described.

A preferable embodiment of the resin composition of the present invention contains at least one resin component selected from a biodegradable resin and a plant-based resin. Any of known biodegradable resins and known plant-based resins may be used. The biodegradable resins include polycaprolactone (PCL), polybutylene succinate (PBS), and a modified polyethylene terephthalate (modified PET) and polyhydroxybutyric acid (PHB) which is produced by a microorganism. PCL, PBS and the modified PET may be obtained by polymerizing monomer obtained from plant material. Representative plant-based resins are polylactic acid (PLA) and a lactic acid copolymer. PLA and the lactic acid copolymer are produced by polymerizing lactic acid that are obtained by fermenting starch or sugar which is obtained from, for example, a corn or a sweet potato. PLA is a biodegradable resin of a hydrolyzable type. In an application which does not prefer the biodegradability, a compound which reduces the hydrolyzability of the resin may be added. In that case, the resin has low biodegradability or does not have biodegradability. As described, however, the plant-based resin is preferably used in the present invention irrespective of degradability from the view point of environment protection, since it is obtained not using the petroleum resources, a burned calorie is low, and the plant which is a material for the resin grows absorbing carbon dioxide.

PBS or PLA is preferably used as the resin component selected from the biodegradable resin and the plant-based resin. In particular PLA or a mixture of PLA and another resin is preferably used. A molded article formed from PLA may be used in various applications since PLA has excellent transparency and rigidity. On the other hand, PLA has drawbacks of low heat durability and low impact resistance, and somewhat low injection moldability. For this reason, it is preferable to mix another resin and/or a modifier into PLA, particularly when PLA is injection molded. For example, PBS is suitable for being mixed with PLA since PBS has excellent heat resistance and PBS itself has biodegradability. Specifically, PLA and PBS are mixed at a ratio of 95:5 to 55:45 (weight ratio). Alternatively, PLA may be modified using a commercially-available modifier for polylactic acid.

The resin component selected from the biodegradable resin and the plant-based resin may be optionally used in combination with another resin which is not the biodegradable resin and the plant-based resin (for example, a non-biodegradable resin whose material is petrochemical feedstocks). In that case, the another resin is preferably contained at a ratio of up to 45 wt % of the entire resin component. If the resin which does not have the biodegradability and is not the plant-based resin is contained in a large amount, the essential feature or effect of lessening the burden on the environment is reduced, which feature is conferred by the biodegradable resin and the plant-based resin.

Another preferable embodiment of the present invention contains polystyrene (PS) as the resin component. Polystyrene is not the biodegradable resin or the plant-based resin. To the extent of this fact, polystyrene adds a more load on the environment than the biodegradable resin and so on. Polystyrene, however, is widely used in various products, and therefore it is possible to prevent or reduce emission of harmful substances during the combustion if this is made to be flame retardant by the non-halogen-based flame retardant. In that sense, it is possible to constitute an environmentally-friendly resin composition.

PS shows sufficiently excellent properties when it is used alone (that is, without being mixed with another resin component) and it may be used in a wide variety of products and may be optionally mixed with another resin. When the resin composition containing PS is used for an exterior body which requires the impact resistance, a rubber-based resin is preferably added as the resin component to give HIPS. One or more resins selected from, for example, butadiene, a silicone-based rubber and an acrylic-based rubber may be added as the rubber-based resins. A butadiene-based rubber is preferably added. The rubber-based resin such as a butadiene-based rubber is preferably mixed at a ratio of 5-45 wt % of the total amount of PS and the rubber-based resin. The impact resistance is significantly improved by mixing the rubber-based resin at the ratio within this range.

In further embodiment of the present invention, the resin component constituting the resin composition of the present invention may be another resin which is not mentioned above. Specifically, the resin composition of the present invention may contain, as the resin component, one or more resins selected from:
1) a thermoplastic resin such as polyethylene, polypropylene, polystyrene, ethylene-vinyl acetate copolymer, polyvinyl chloride, AS, ABS, polyethylene terephthalate (PET) and polybutylene terephthalate (PBT);
2) a thermoplastic elastomer such as a butadiene rubber (BR), isoprene rubber (IR), styrene/butadiene copolymer (SBR), styrene/ethylene-butylene copolymer (HSBR) and styrene/isoprene copolymer (SIR);
3) a thermoplastic engineering resin such as polyamide (PA), polycarbonate (PC) and poly phenylene ether (PPE)
4) a super engineering resin such as polyarylate (PAR) and polyetheretherketone (PEEK)
5) a thermosetting resin such as an epoxy resin (EP), a vinyl ester resin (VE), a polyimide (PI) and a polyurethane (PU).

Next, the flame retardancy-imparting component which confers flame retardancy is described. As described above, a catalyst employed in a process for purifying, cracking, synthesizing and/or reforming hydrocarbon is used as the flame retardancy-imparting component. Specifically, for example, a catalytically cracking catalyst, an isomerizing catalyst, a dehydrogenation catalyst, a hydrocracking catalyst, a catalyst for removing an organic compound may be used as the flame retardancy-imparting component. It is preferable that these catalysts do not contain halogen in a molecule from the view point of environment protection. However, even if a catalyst molecule used in purification of the like of hydrocarbon contains a halogen atom, its structure is considerably different from dioxin in general, while the conventional halogen-based flame retarder has a structure similar to dioxin. Therefore, it is considered that the catalyst hardly produces dioxin when a combustion process is properly selected. In that sense, the below-listed catalysts containing halogen atoms can be called as substantially non-halogen-based flame retardancy-imparting components. Therefore, in this specification, a term "non-halogen-based" or "not containing halogen" is used in the sense of including the below-listed catalysts containing halogen atoms.

The catalytic cracking catalysts include, for example, a silica-alumina catalyst ($SiO_2/Al_2O_3$), a silica-magnesia catalyst ($MgO/SiO_2$), activated clay, zeolite, and silica-alumina-magnesia catalyst ($SiO_2/Al_2O_3/MgO$).

In the specification including the following description, "/" used with respect to the catalyst means that two or more components are combined, and that, for example, two or more compounds forms a compound of higher order or a complex compound such as a complex oxide, two or more compounds are mixed, or one or more of two or more component is a carrier where the other component(s) is supported. Each "/" in each catalyst which is specifically exemplified in the specification has a meaning generally used in the field of purification or catalytically cracking of hydrocarbon (for example, petrochemical industries), and the meaning is known to those skilled in the art.

The isomerizing catalysts which can be used as a flame retardancy-imparting component include, for example, $Pt/Al_2O_3$/fluoride, $Pt/SiO_2/Al_2O_3$, $Pd/SiO_2/Al_2O_3$, $ZnCl_2$, $Cr_2O_3/Al_2O_3$, a borate, aluminum phosphate, $Pt/SiO_2/Al_2O_3$, $Ni/SiO_2/Al_2O_3$, silicophosphate, $HF—BF_3$, phosphoric acid, anhydrous aluminum sulphate, $AlCl_2/HCl$, $ZnCl_2/Al_2O_3$, silica gel, methanesulfonic acid, aluminum sulfate/$SiO_2$, cobalt sulfate/$SiO_2$, iron sulfate/$SiO_2$, manganic sulfate/$SiO_2$, copper sulfate/$SiO_2$, nickel sulfate/$SiO_2$, zinc sulfate/$SiO_2$, potassium sulfate/$SiO_2$, and calcium sulphate/$SiO_2$.

The dehydrogenation catalysts which can be used as a flame retardancy-imparting component include, for example, CeO, $La_2O_3$, SnO, CuO, ZnO, $Fe_2O_3/Al_2O_3/K_2O$, $Cr_2O_3/Al_2O_3/K_2O$, $Cr_2O_3/SiO_2$, $Cr_2O_3/MgO/Al_2O_3$, $Ru/Al_2O_3$, $Fe_2O_3/Cr_2O_3/K_2CO_3$, $Fe_2O_3/Cr_2O_3/K_2O$, $Fe_2O_3/Cr_2O_3/$ KOH, $Pt/Al_2O_3$, $MoO_3/Al_2O_3$, $Cr_2O_3/Al_2O_3$, $MoO_2/Al_2O_3$, $MgO/Fe_2O_3/CuO/K_2O$, $Ca_8Ni(PO_4)_6/Cr_2O_3$/graphite, CuCr/Mn, Cu/Zn and $Fe_2O_3$. Alternatively, any of Cr, phosphate molybdate, ZnO/CaO, Cu/ZnO, SrO, $Cr_2O_3$/ZnO, $Cr_2O_3/$ BeO, $MnO_2$, $VO_2$, $V_2O_5$, SrO, BaO, $Fe_2O_3$, $Cr_2O_3$/Pb, $Cr_2O_3/$ CaO, $Cr_2O_3/CeO_2$, $Cr_2O_3/K_2O/MgO$ and $WO_2$ may be used alone or being supported on $Al_2O_3$ or $SiO_2$, as the flame retardancy-imparting component.

The hydrocracking catalysts which can be used as a flame retardancy-imparting component include, for example, CoMo, $MoO_3$, NiO, CoO, NiMo, Pd/C(activated charcoal), Pd/C, Ru/C, Ni, Co, $Ni/Al_2O_3$, CuCr/Mn/Ba, CuCe/Mn, Ni/KG (diatom earth), Ni/CuCr/KG and NiO.

The desulfurization catalysts which can be used as a flame retardancy-imparting component include, for example, activated charcoal, ZnO, CuO, Ni, and $Cr_2O_3$.

The alkylation catalysts which can be used as a flame retardancy-imparting component include, for example, $Fe_2O_3$, $K_2Co_3$, and BaO.

The synthesis catalysts which can be used as a flame retardancy-imparting component include, for example, Fe, FeO, $Fe_3O_4$, CaO, $K_2O$ and $Na_2O_3$.

The catalysts for removing an organic compound, which can be used as a flame retardancy-imparting component include, for example, $Pt/Al_2O_3$, $Pd/Al_2O_3$, $AlPo_4$, NiO, MnO, CuO, $CeO_2$, and $Ca(OH)_2$.

It should be noted that a compound other than those exemplified above may be used as the flame retardancy-imparting component as long as it serves to decompose the resin composition into molecules having a low molecular weight during the combustion and thereby it confers the flame retardancy.

Any catalyst may be mixed with the resin component after the activity of the catalyst is increased (that is, the catalyst is activated), if necessary. The activation may be carried out by, for example, heating the catalyst.

In the resin composition of the present invention, two or more flame retardancy-imparting components can be used in combination. The combination of two or more flame retardancy-imparting components may be a combination of two or more catalysts selected from the above mentioned catalysts, or may be a combination of the catalyst and a conventional flame retarder. In any case, the ratio of each flame retardancy-imparting component may be selected depending on the desired flame retardancy.

In the present invention, when the catalyst and the conventional flame retarder are used in combination, it is possible to achieve the effect of reducing the amount of the conventional flame retarder. Specifically, when the catalyst (for example, the silica-magnesia catalyst) is used combined with a phosphorus-based flame retarder and the catalyst is added so that it occupies 5 wt % of the resin composition while the ratio of the phosphorus-based flame retarder is reduced to 10 wt %, the flame retardancy of the resin composition can be equal to that of a resin composition containing only the phosphorus-based flame retarder in an amount of 40 wt %. Therefore, the present invention makes it possible to obtain the resin composition with high flame retardancy by using the catalyst as the flame retardancy-imparting component even if the ratio of the known flame retarder is reduced. This allows the load on the environment to be less than before, even though the complete non-halogen-based resin composition is not realized.

The known flame retarders are, for example, the phosphorus-based flame retarder, the halogen-based flame retarder, and a metal hydroxide-based flame retarder. The metal hydroxide-based flame retarder are, for example, magnesium hydroxide ($Mg(OH)_2$) and aluminum hydroxide ($Al(OH)_3$). The metal hydroxide-based flame retarder is preferably used when the molded body having the high strength and rigidity, such as the back cover of television receiver, is desired, since the rigidity of the molded body is increased by mixing the metal hydroxide is mixed into the resin composition.

Some of these flame retardancy-imparting components achieve high flame retardation in a small amount when they are added to the biodegradable resin and the plant-based resin, particularly the plant-based resin and PS. Such flame retardancy-imparting components include the silica-alumina catalyst, silica-magnesia catalyst, $La_2O_3$ and CeO. Therefore, when these flame retardancy-imparting components are used, the additive amount of the component can be reduced, whereby the change in physical properties (for example, the reduction in the bending strength and the modulus of elasticity) of the resin composition caused by the addition of the flame retardancy-imparting component can be reduced. Further, when the additive amount of the flame retardancy-imparting component is reduced, it is easier to recycle this resin composition for re-use. The silica-magnesia catalyst is preferably used since it gives higher flame retardancy to the plant-based resin (particularly, polylactic acid) and PS compared to the known halogen-based flame retarder and the phosphorus-based flame retardant.

The silica-magnesia catalyst ($MgO/SiO_2$) is one of solid acid catalysts, and is a double oxide of silicon oxide and magnesium oxide or formed by binding these two oxides. In the present invention, it is preferable to use the silica-magnesia catalyst wherein the proportion of MgO is from 10 wt % to 50 wt %. When the proportion of MgO is below 10 wt %, the catalytic action is not fully exerted (that is, the action of cracking the resin is weak), and therefore the effect of flame retardation is reduced. Further, if the proportion of MgO is above 50 wt %, the catalytic action is too strong whereby the resin is decomposed into molecules having a large molecular weight to increase the burned calorie, resulting in reduction in the effect of flame retardation.

The mixing proportion of the flame retardancy-imparting component depends on the type of the flame retardancy-imparting component, the type of the resin component, the degree of flame retardancy required for the resin composition and the change of physical properties of the resin composition caused by the addition of the flame retardancy-imparting component. Specifically, for example, the flame retardancy-imparting component which is selected from the above-listed catalysts preferably occupies from 0.5 wt % to 40 wt % of the resin composition. When the proportion of the flame retardancy-imparting component is below 0.5 wt %, it is difficult to achieve significant flame retardancy improvement. When the portion of the flame retardancy-imparting component is above 40 wt %, undesired influence due to mixing of the flame retardancy-imparting component (for example, mold defect caused by reduction in flowability) may be pronounced.

The mixing proportion of the flame retardancy-imparting component is illustrative and the optimal mixing proportion of the flame retardancy-imparting component depends on the type of thereof and the type of the resin component. For example, when polylactic acid, lactic acid copolymer or a mixture of at least one of these resins and another resin is the resin component and the catalyst (particularly, silica-magnesia catalyst) is the flame retardancy-imparting component, it is preferable to mix the catalyst with the resin component so that the catalyst occupies from 1 wt % to 15 wt % of the resin composition. Further, for example, when polystyrene or a mixture of polystyrene and the butadiene rubber is included as the resin component and the catalyst (particularly, silica-magnesia catalyst) is the flame retardancy-imparting component, it is preferable to mix the catalyst with the resin component so that the catalyst occupies from 1 wt % to 45 wt % of the resin composition.

The flame retardancy-imparting component is preferably dispersed in the resin with the component supported on an inorganic porous material. Specifically, the flame retardancy-imparting component is preferably dispersed in the resin by a method wherein the flame retardancy-imparting component is supported on the inorganic porous material followed by being kneaded with the resin component so that the inorganic porous material is crushed into fine particles and dispersed in the resin. The combination with the inorganic porous material gives the resin composition wherein the flame retardancy-imparting component is more evenly dispersed, whereby the additive amount of the flame retardancy-imparting component is more reduced. In other words, in the case where the inorganic porous material is employed, granules which are large enough not to aggregate are added at the beginning of kneading and then they are crushed into fine particles during the kneading to be dispersed evenly, which results in improvement in dispersibility of the flame retardancy-imparting component compared with the case of adding the flame retardancy-imparting component alone. Further, the inorganic porous material improves the flame retardancy of the resin composition synergistically with the supported flame retardancy-imparting component, since the material itself has a characteristic of conferring flame retardancy to the resin.

The inorganic porous material is a porous material formed from silicon oxide and/or aluminum oxide, which has pores of which diameter is from 10 nm to 50 nm at a ratio of 45 vol % to 55 vol %. Such an inorganic porous material is preferably a granular material which has a diameter of from 100 nm to 1000 nm when the flame retardancy-imparting component is supported. When the granular diameter is too small, aggregation may occur to give giant particles. On the other hand, when the granular diameter is too large, the granular diameter of the inorganic porous material after being crushed in the kneading step may be large not to be dispersed evenly. The inorganic porous material preferably has a granular diameter of from 25 nm to 150 nm in the final resin composition (that is, after kneading the inorganic porous material). In the case where the inorganic porous material is used, the flame retardancy-imparting component may be supported at a ratio of 3 parts to 50 parts by weight to the inorganic porous material of 100 parts by weight. The inorganic porous material which supports the flame retardancy-imparting component at such a ratio may be added and kneaded so that it occupies, for example, from 1 wt % to 40 wt % of the entire resin composition. The supported amount of the flame retardancy-imparting component and the added amount of the inorganic porous material are illustrative, and they may be outside these ranges depending on the type of the flame retardancy-imparting component.

The flame retardancy-imparting component may be supported on the inorganic porous material by a method wherein the inorganic porous material is immersed in a liquid in which the flame retardancy-imparting component to be supported is dissolved or dispersed in a solvent, and then the solvent is evaporated by heating. The inorganic porous material itself can be produced by a known method. For example, the material may be obtained by a technique of dissolving a pore-forming agent (for example, a water soluble inorganic salt) in a silica sol and sintering a dried sol followed by dissolving the pore-forming agent into hot water to remove the agent from resultant particles. Alternatively, the inorganic porous material may be a porous glass or a zeolite. When the inorganic porous material is, for example, the zeolite, the inorganic porous material itself acts as the catalytic cracking catalyst of hydrocarbon. In that case, the inorganic porous material may be regarded as the flame retardancy-imparting component. When the inorganic porous material is regarded as the flame retardancy-imparting component, the preferable upper limit of the additive amount thereof is 40 wt % and is the same as that of the flame retardancy-imparting component as described above.

A specific example is described wherein polylactic acid or the lactic acid copolymer is selected as the resin component and CeO and/or $La_2O_3$ is selected as the flame retardancy-imparting component. In this case, it is preferable to employ, as the inorganic porous material, a porous material formed from silicon oxide (silica) containing pores with a pore diameter of from 10 nm to 50 nm at a ratio of 44 vol % to 55 vol %, in a form of granules having a granular diameter of from 100 nm to 500 nm. CeO and/or $La_2O_3$ is preferably supported on the silica porous material at a ratio of 5 parts to 45 parts by weight to the silica porous material of 100 parts by weight, and more preferably at a ratio of 10 parts to 35 parts by weight. The silica porous material supporting CeO and/or $La_2O_3$ is preferably added so as to occupy 5 wt % to 40 wt % of the entire resin composition, and more preferably 5 wt % to 15 wt %. The inorganic porous material is dispersed as fine particles having a particle diameter of from 25 nm to 150 nm, and CeO and/or $La_2O_3$ is mixed at a ratio of 0.5 wt % to 5.25 wt %, in the resin composition which is obtained by adding this inorganic porous material followed by kneading. The use of the inorganic porous material makes it possible to reduce the added ratio of the flame retardancy-imparting component.

The resin composition of the present invention may contain an auxiliary agent for flame retarder in addition to the flame retardancy-imparting component selected from the above catalysts. The auxiliary agent for flame retarder cannot serve as the flame-retardant component by itself, but enhances the flame retardation effect exerted by the flame-retardant component, when the agent is added together with the flame-retardant component. Therefore, the use of the auxiliary agent for flame retarder enables the additive amount of the catalyst to be further reduced. As the auxiliary agent for flame retarder, for example, one or more compounds may be used, which compound(s) is selected from an organic peroxide, such as a ketone peroxide, a peroxy ketal, a hydroperoxide, and a dialkyl peroxide, a peroxy ester and a peroxydicarbonate; a dimethyl-diphenyl butane; and a derivative of these compounds. When the organic peroxide is used as the auxiliary agent for flame retarder, it is presumed that the organic peroxide releases oxygen in the resin composition whereby the flame retardancy of the resin composition is improved. When the dimethyl-diphenyl butane is used as the auxiliary agent for flame retarder, it is presumed that the dimethyl-diphenyl butane exerts a radical trap effect whereby the flame retardancy of the resin composition is improved. These presumptions, however, do not affect the scope of the present invention. When a plurality of compounds are used, the mixing ratio of the compounds is not limited to a particular one, and it is selected so that desired flame retardant property is achieved. The auxiliary agent for flame retarder may be added in an amount of 5 parts to 45 parts by weight to the flame-retardant component of 100 parts by weight, depending on the type and the added amount of the flame-retardant component. Further, the total amount of the auxiliary agent for flame retarder and the flame-retardant component (that is the amount of the flame retardancy-imparting component) preferably corresponds to an amount of 5 wt % to 40 wt % of the entire resin composition. The reason therefor is as described in connection with the flame retardancy-imparting component.

The resin composition of the present invention may contain another component in addition to the above-described components (that is, the resin component, the flame retardancy-imparting component (including the inorganic porous material in the case where the flame-retardancy-imparting component is supported on the material). For example, a colorant may be contained so that the color of the resin composition is a desired one. Further, for the purpose of achieving the desired physical property of the resin composition, a butadiene rubber, for example, may be included in order to improve impact resistance as described above. The impact resistance is improved when the resin composition further includes an acrylic rubber and/or a silicon rubber. These rubbers may be employed when it is desired that the impact resistance of the biodegradable resin and/or the plant-based resin is improved.

The resin composition of the present invention is produced by kneading the resin component and the flame retardancy-imparting component. The kneading may be carried out before forming pellets, when the pellet-shaped resin composition is produced. Alternatively, a pellet-shaped resin (or resin composition) may be kneaded with the flame-retardant component, and then formed into a pellet shape again. Alternatively, the flame retardancy-imparting component may be mixed, during a molding step, with a melted resin that does not contain the flame-retardant component. When an exterior body of an electric appliance is produced by molding a plastic, an injection molding method wherein the resin is melted and injection-molded in a metallic mold of a desired shape, or a compression molding method wherein the resin is melted and a pressure is applied with an upper mold and a lower mold, is generally employed. In these molding methods, a step of kneading the melted resin with a kneader is carried out. Therefore, the flame retardancy-imparting component is mixed with the resin component upon the kneading, to give a molded body formed from the flame-retardant resin composition. Since such addition of the flame retardancy-imparting component does not require another step of adding the flame retardancy-imparting component, the resin composition of the present invention is efficiently produced.

The resin composition of the present invention is obtained by using, as the flame retardancy-imparting component, the catalyst which does not substantially contain halogen so as to confer flame retardancy to an environment-friendly resin or the conventional polystyrene. The resin composition of the present invention is preferably used in a form of molded body, for packages or parts of various electric appliances. Specifically, the resin composition of the present invention may be used as members for the packages and the parts of a computer, a cellular phone, audio products (such as a radio, a cassette deck, a CD player, and an MD player), a microphone, a keyboard, and a portable audio player. Alternatively, the resin composition of the present invention may be used for an interior material of a car, an exterior material of a two-wheel vehicle, and various miscellaneous household goods.

EXAMPLES

Test 1

Polylactic acid (PLA) of 70 wt %, which was synthesized from corn as a material and polybutylene succinate (PBS) of 30 wt % were kneaded with a twin screw kneader and pellets were produced (Step 1). Herein, PBS was added for the purpose of improving heat resistance. Silica-magnesia catalyst powder (MgO: 24.5 wt %) as the flame-retardant component was kneaded together with the pellets obtained and a mixing ratio of the silica-magnesia catalyst was determined which ratio was necessary for obtaining a flame-retardant resin composition which satisfied V0 according to the UL specification.

A blending sequence for the composition in this test is illustrated by a flow chart shown in FIG. 1. In this test, the pellets obtained in Step 1 and the silica-magnesia catalyst which was previously activated by heating treatment were kneaded with the twin screw kneader at 185° C. (Step 2), and press-molded into a test piece of 125 mm×13 mm×3.2 mm (at a molding temperature of 180° C. under a pressure of 120 kg/cm$^2$) (Step 3). In this test, a plurality of test pieces were produced varying the mixing ratio of the silica-magnesia catalyst to the pellet and each piece was evaluated as to flame retardancy. The silica magnesia catalyst was used in a form of powder having a particle diameter of about 2 to 80 μm. The powder was not crushed by kneading and the powder retaining the initial size was dispersed in the resin. As a result of evaluation, the mixing ratio of PLA-PBS pellet to the silica-magnesia catalyst was required to be 90:10 (weight ratio) in order to achieve the flame retardancy V0 according to the UL specification. The results of the UL-94 vertical flame test for the test piece that contained the silica-magnesia catalyst in an amount of 10 wt % are shown as the results of Test 1 in Table 3.

Test 2

Polylactic acid (PLA) which was synthesized from corn as a material and the silica-magnesia catalyst powder (MgO: 24.5 wt %) were kneaded and a mixing ratio of the silica-magnesia catalyst was determined which ratio was necessary for obtaining a flame-retardant resin composition which satisfied V0 according to the UL specification.

Figure 2:
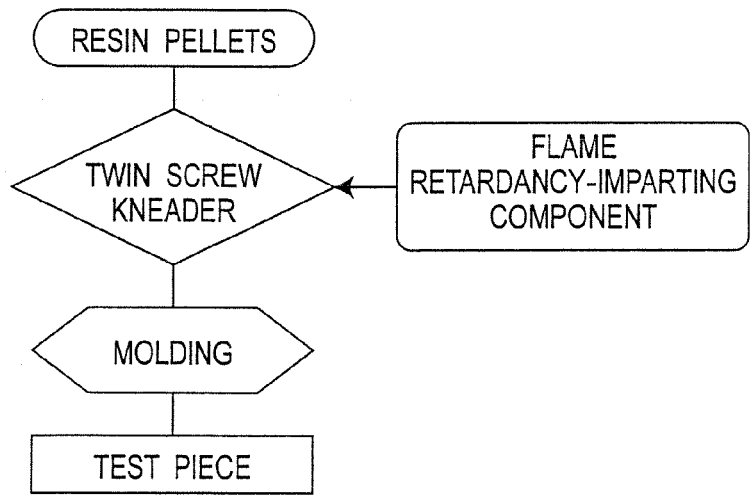
FIG. 2 is a flow chart showing a method for producing a flame-retardant resin composition of the present invention.

A blending sequence for the composition in this test is illustrated by a flow chart shown in FIG. 2. In this test, the polylactic acid (PLA) pellets and the silica-magnesia catalyst which was previously activated by heating treatment were kneaded with the twin screw kneader at 185° C. (Step 1), and press-molded into a test piece of 125 mm×13 mm×3.2 mm (at a molding temperature of 180° C. under a pressure of 120 kg/cm$^2$) (Step 2). In this test, a plurality of test pieces were produced varying the mixing ratio of the pellet to the silica-magnesia catalyst and each piece was evaluated as to flame retardancy. The silica-magnesia catalyst was the same as that used in Test 1. The catalyst was not crushed by kneading and the powder retaining the initial size was dispersed in the resin. As a result of evaluation, the mixing ratio of PLA pellet to the silica-magnesia catalyst was required to be 90:10 (weight ratio) in order to achieve the flame retardancy V0 according to the UL specification. The results of the UL-94 vertical flame test for the test piece that contained the silica-magnesia catalyst in an amount of 10 wt % are shown as the results of Test 2 in Table 3.

Test 3

Pellets were produced by kneading polylactic acid (PLA) and polybutylene succinate (PBS) following the same procedures as those in Test 1 (Step 1).

A blending sequence (order) for the composition in this test is also illustrated by the flow chart shown in FIG. 1 similarly to Test 1. In this test, $La_2O_3$ catalyst as the flame-retardant component was supported on the $SiO_2$ porous material. $La_2O_3$ of 40 parts by weight was supported to the porous material of 100 parts by weight. The pellets of 90 wt % obtained in Step 1 and the $La_2O_3$-supporting $SiO_2$ porous material of 10 wt % were kneaded with the twin screw kneader at 185° C. (Step 2), and press-molded into a test piece of 125 mm×13 mm×3.2 mm (at a molding temperature of 180° C. under a pressure of 120 kg/cm$^2$) (Step 3). The $SiO_2$ porous material used in this test had a porosity of about 45 vol % to about 50 vol %, and a granular diameter of about 100 nm to about 1000 nm. This $SiO_2$ porous material was crushed by a shearing force when being kneaded with the resin, and finally dispersed as finer particles which had a particle diameter of about 25 nm to about 150 nm (a mean particle diameter of about 75 nm) in the resin. The content of $La_2O_3$ in the resin composition was calculated to be 4 wt %.

The test piece obtained was subjected to the UL-94 vertical flame test similarly to Test 1. The results are shown in Table 3. From the test results shown in Table 3, this sample was evaluated to be V0 according to the UL specification.

Test 4

The $La_2O_3$ catalyst powder which was not supported on the $SiO_2$ porous material was kneaded together with the pellets obtained in Step 1 of Test 1 and a mixing ratio of $La_2O_3$ catalyst was determined which ratio was necessary for obtaining a flame-retardant resin composition which satisfied V0 according to the UL specification.

A blending sequence (order) for the composition in this test is illustrated by the flow chart shown in FIG. 1 similarly to Test 1. In this test, the pellets obtained in Step 1 and $La_2O_3$ catalyst as the flame-retardant component were kneaded by the twin screw kneader at 185° C. (Step 2), and press-molded into a test piece of 125 mm×13 mm×3.2 mm (at a molding temperature of 180° C. under a pressure of 120 kg/cm$^2$) (Step 3). In this test, a plurality of test pieces were made varying the mixing ratio of the pellet to the $La_2O_3$ catalyst and each piece was evaluated as to flame retardancy. $La_2O_3$ was used in a form of powder which had a particle diameter of about 5 μm to about 100 μm without being supported on the $SiO_2$ porous material. In this case, the powder was not crushed by kneading and the powder retaining the initial size was dispersed in the resin. Therefore, the mixing ratio of the pellet to $La_2O_3$ catalyst was required to be 86:14 (weight ratio) in order to achieve the flame retardancy V0 according to the UL specification, similarly to Test 3. The results of the UL-94 vertical flame test for the test piece that contained $La_2O_3$ catalyst in an amount of 14 wt % are shown as the results of Test 4 in Table 3.

Test 5

PS resin pellets and the silica-magnesia catalyst powder (MgO: 24.5 wt %) were kneaded and a mixing ratio of the silica-magnesia catalyst was determined which ratio was necessary for obtaining a flame-retardant resin composition which satisfied V0 according to the UL specification.

A blending sequence for the composition in this test is illustrated by a flow chart shown in FIG. 2. In this test, the PS pellets and the silica-magnesia catalyst, as the flame-retardant component, which was previously activated by heating treatment were kneaded with the twin screw kneader at 180° C. (Step 1), and press-molded into a test piece of 125 mm×13 mm×3.2 mm (at a molding temperature of 180° C. under a pressure of 120 kg/cm²) (Step 2). In this test, a plurality of test pieces were produced varying the mixing ratio of the pellet to the silica-magnesia catalyst and each piece was evaluated as to flame retardancy. The silica-magnesia catalyst was the same as that used in Test 1. The catalyst was not crushed by kneading and the powder retaining the initial size was dispersed in the resin.

Therefore, the mixing ratio of the pellet to the silica-magnesia catalyst was required to be 88:12 (weight ratio) in order to achieve the flame retardancy V0 according to the UL specification. The results of the UL-94 vertical flame test for the test piece that contained the silica-magnesia catalyst in an amount of 12 wt % are shown as the results of Test 5 in Table 3.

Test 6

PS resin pellets and CeO catalyst were kneaded and a mixing ratio of the CeO catalyst was determined which ratio was necessary for obtaining a flame-retardant resin composition which satisfied V0 according to the UL specification.

A blending sequence for the composition in this test is illustrated by a flow chart shown in FIG. 2. In this test, the PS pellets and the CeO catalyst powder as the flame-retardant component were kneaded with the twin screw kneader at 180° C. (Step 1), and press-molded into a test piece of 125 mm×13 mm×3.2 mm (at a molding temperature of 180° C. under a pressure of 120 kg/cm²) (Step 2). In this test, a plurality of test pieces were produced varying the mixing ratio of the pellet to the CeO catalyst and each piece was evaluated as to flame retardancy. The CeO catalyst was used in a form of powder having a particle diameter of about 8 to 70 μm. The powder was not crushed by kneading and the powder retaining the initial size was dispersed in the resin.

Therefore, the mixing ratio of the pellet to the CeO catalyst was required to be 88:12 (weight ratio) in order to achieve the flame retardancy V0 according to the UL specification. The results of the UL-94 vertical flame test for the test piece that contained the CeO catalyst in an amount of 12 wt % are shown as the results of Test 6 in Table 3.

Test 7

The PS resin pellet and the CeO catalyst supported on the $SiO_2$ porous material were kneaded and a mixing ratio of the CeO catalyst was determined which ratio was necessary for obtaining a flame-retardant resin composition which satisfied V0 according to the UL specification.

A blending sequence (order) for the composition in this test is illustrated by a flow chart shown in FIG. 2. In this test, the CeO catalyst as the flame-retardant component was supported on the $SiO_2$ porous material. The CeO catalyst of 42 parts by weight was supported to the porous material of 100 parts by weight. The PS pellets of 90 wt % and the CeO-supporting $SiO_2$ porous material of 10 wt % were kneaded with the twin screw kneader at 180° C. (Step 2), and press-molded into a test piece of 125 mm×13 mm×3.2 mm (at a molding temperature of 180° C. under a pressure of 120 kg/cm²) (Step 3). The $SiO_2$ porous material particles were the same as those used in Test 3, and finally dispersed as finer particles of nanoscale by kneading. Further, the content of CeO catalyst in the resin composition was calculated to be 4.2 wt %.

The test piece obtained was subjected to the UL-94 vertical flame test similarly to Test 1. The results are shown in Table 3. From the test results shown in Table 3, this sample was evaluated to be V0 according to the UL specification.

Test 8

Pellets were produced by kneading polylactic acid (PLA) and polybutylene succinate (PBS) following the same procedures as those in Test 1 (Step 1). A blending sequence (order) for the composition in this test is illustrated by the flow chart shown in FIG. 1 similarly to Test 1. In this test, the pellets of 90 wt % obtained in Step 1, the silica-magnesia catalyst of 5 wt %, which was the same as that used in Test 1 as the flame-retardant component, and t-butyl-trimethylsil peroxide ("PERBUTYL SM" manufactured by NOF CORPORATION) of 5 wt % were kneaded with the twin screw kneader at 185° C. (Step 2), and press-molded into a test piece of 125 mm×13 mm×3.2 mm (at a molding temperature of 180° C. under a pressure of 120 kg/cm²) (Step 3).

The test piece obtained was subjected to the UL-94 vertical flame test similarly to Test 1. The results are shown in Table 3. From the test results shown in Table 3, this sample was evaluated to be V0 according to the UL specification.

Test 9

Stalk portions of kenaf were crushed with a hammer and water was added thereto. The kenaf stalks were cut into fibers of about 100 μm length by agitating with a mixer. Next, a mixture of kenaf and water was spread on a vat and placed in a drying oven (60° C.) and dried for 48 hours. After drying, the kenaf is scraped off from the vat to give kenaf fibers to be mixed with polylactic acid. Pellets of polylactic acid (PLA) and kenaf fibers were kneaded at a ratio of 70:30 (weight ratio) with a twin screw kneader so as to produce pellets. Next, these pellets of 85 wt % and the silica-magnesia catalyst (MgO: 24.5 wt %) of 15 wt % were blended according to the same procedures as those in Test 1, whereby a test piece of a flame-retardant resin composition was produced. This piece was subjected to the UL-94 vertical test following the same procedures as those in Test 1. As a result, this had flame retardancy meeting the V0 rating. The results are shown in Table 3.

Test 10

Polylactic acid (PLA) of 50 wt % and polybutylene succinate of 22.5 wt % and the silica-magnesia catalyst (MgO: 24.5 wt %) of 12.5 wt % and Mg(OH)$_2$ of 15 wt % were charged into the twin screw kneader and kneaded at 500 rpm and 195° C. so as to produce pellets. The resultant pellets were charged into an injection molding machine to carry out injection molding with a metallic mold for a back cover of a television receiver. The molding temperature was 180° C., and a temperature of the metallic mold was 80° C. so that the elution of the flame-retardant component due to quenching was avoided. After molding, the metallic mold was cooled and the molded product was taken out at a room temperature whereby the back cover of television receiver was obtained.

The physical property of the resultant back cover was compared with that of a back cover of a television receiver which was formed form a conventional resin composition that was obtained by mixing polystyrene (PS) with a halogen-based flame retarder. Significant difference was not observed.

Further, in order to evaluate the flame retardancy of this resin composition, the test piece was formed by press-molding the above composition into a test piece of 125 mm×13 mm×3.2 mm (at a molding temperature of 180° C. under a pressure of 120 kg/cm$^2$) and the test piece was subjected to the UL-94 vertical flame test. The results are shown in Table 3 as the results of this test.

Test 11

A HIPS resin of 88 wt % which contains butadiene rubber of 8 wt % and polystyrene of 92 wt %, and the silica-magnesia catalyst (MgO: 24.5 wt %) of 12 wt % were charged into charged into the twin screw kneader and kneaded at 500 rpm and 180° C. so as to produce pellets. The resultant pellets were charged into an injection molding machine to carry out injection molding with a metallic mold for the back cover of television receiver. The molding temperature was 180° C., and a temperature of the metallic mold was room temperature. After molding, the metallic mold was cooled and the molded product was taken out at a room temperature whereby the back cover of television receiver was obtained.

The physical property of the resultant back cover was compared with that of a back cover of a television receiver which was formed form a conventional resin composition that was obtained by mixing HIPS with a halogen-based flame retarder. Significant difference was not observed.

Further, in order to evaluate the flame retardancy of this resin composition, the test piece was formed by press-molding the above composition into a test piece of 125 mm×13 mm×3.2 mm (at a molding temperature of 180° C. under a pressure of 120 kg/cm$^2$) and the test piece was subjected to the UL-94 vertical flame test. The results are shown in Table 3 as the results of this test.

Test 12

Pellets were produced by kneading polylactic acid (PLA) and polybutylene succinate (PBS) following the same procedures as those in Test 1 (Step 1). The resultant pellets were mixed with a mixed powder, as the flame-retardant component, wherein MgO powder and SiO$_2$ powder were mixed at a ratio of 1:3.

A blending sequence (order) for the composition employed in this test is illustrated by the flow chart shown in FIG. 1 similarly to Test 1. In this test, the pellets obtained in Step 1 and MgO which was previously activated by heating treatment and SiO$_2$ which was similarly subjected to heating treatment were kneaded with the twin screw kneader at 185° C. (Step 2), and press-molded into a test piece of 125 mm×13 mm×3.2 mm (at a molding temperature of 180° C. under a pressure of 120 kg/cm$^2$) (Step 3). In this test, a plurality of test pieces were produced varying the mixing ratio of the pellet to the mixed powder and each piece was evaluated as to flame retardancy. The MgO and SiO$_2$ were used in a form of powder having a particle diameter of about 2 to 80 µm, respectively. The powder was not crushed by kneading and the powder retaining the initial size was dispersed in the resin. As a result of evaluation, the flame retardancy V0 according to the UL specification was not achieved in any of the test pieces. In the most flame-retardant test piece, the mixing ratio of PLA-PBS, MgO and SiO$_2$ was 90:2.5:7.5 (weight ratio). A test piece was made with this mixing ratio and the piece was subjected to the UL-94 vertical flame test. The results are shown in Table 3 as the results of this test.

Test 13

Polylactic acid (PLA) which was synthesized from corn as a material was kneaded with MgO powder and SiO$_2$ powder as the flame-retardant components.

A blending sequence for the composition employed in this test is illustrated by a flow chart shown in FIG. 2. In this test, the pellets obtained in Step 1 and MgO which was previously activated by heating treatment and SiO$_2$ which was similarly subjected to heating treatment were kneaded with the twin screw kneader at 185° C. (Step 1), and press-molded into a test piece of 125 mm×13 mm×3.2 mm (at a molding temperature of 180° C. under a pressure of 120 kg/cm$^2$) (Step 2). In this test, a plurality of test pieces were produced varying the mixing ratio of the pellet, the MgO powder and SiO$_2$ powder and each piece was evaluated as to flame retardancy. The MgO powder and the SiO$_2$ powder ware the same as those used in Test 12. The powder was not crushed by kneading and the powder retaining the initial size was dispersed in the resin. The test pieces were made with various mixing ratios and subjected to the UL-94 vertical flame test. As a result of evaluation, the flame retardancy V0 according to the UL specification was not achieved in any of the test pieces. In the most flame-retardant test piece, the mixing ratio of the PLA resin pellet, MgO and SiO$_2$ was 90:2.5:7.5 (weight ratio). A test piece was made with this mixing ratio and the piece was subjected to the UL-94 vertical flame test. The results are shown in Table 3 as the results of Test 13.

Test 14

PS resin pellets were kneaded with MgO powder and SiO$_2$ powder as the flame-retardant components. A blending sequence for the composition employed in this test is illustrated by a flow chart shown in FIG. 2. In this test, the PS pellets and MgO which was previously activated by heating treatment and SiO$_2$ which was similarly subjected to heating treatment were kneaded with the twin screw kneader at 185° C. (Step 1), and press-molded into a test piece of 125 mm×13 mm×3.2 mm (at a molding temperature of 180° C. under a pressure of 120 kg/cm$^2$) (Step 2). In this test, a plurality of test pieces were produced varying the mixing ratio of the pellet, MgO and SiO$_2$ and each piece was evaluated as to flame retardancy. The MgO powder and the SiO$_2$ powder were the same as those used in Test 12. The powder was not crushed by kneading and the powder retaining the initial size was dispersed in the resin. The test pieces were made with various mixing ratios and subjected to the UL-94 vertical flame test. As a result of evaluation, the flame retardancy V0 according to the UL specification was not achieved in any of the test pieces. In the most flame-retardant test piece, the mixing ratio of the PS resin pellet, MgO and SiO$_2$ was 90:2.4:7.6 (weight ratio). The evaluation results of flame retardancy for the test piece with this mixing ratio are shown in Table 3 as the results of Test 14.

Test 15

HIPS resin pellets were kneaded with MgO powder and SiO$_2$ powder as the flame-retardant components. A blending sequence for the composition employed in this test is illustrated by a flow chart shown in FIG. 2. In this test, the HIPS pellets and MgO which was previously activated by heating treatment and $SiO_2$ which was similarly subjected to heating treatment were kneaded with the twin screw kneader at 185° C. (Step 1), and press-molded into a test piece of 125 mm×13 mm×3.2 mm (at a molding temperature of 180° C. under a pressure of 120 kg/cm$^2$) (Step 2). In this test, a plurality of test pieces were produced varying the mixing ratio of the pellet, MgO and $SiO_2$ and each piece was evaluated as to flame retardancy. The MgO powder and the $SiO_2$ powder ware the same as those used in Test 12. The powder was not crushed by kneading and the powder retaining the initial size was dispersed in the resin. The test pieces were made with various mixing ratios and subjected to the UL-94 vertical flame test. As a result of evaluation, the flame retardancy V0 according to the UL specification was not achieved in any of the test pieces. In the most flame-retardant test piece, the mixing ratio of the HIPS resin pellet, MgO and $SiO_2$ was 90:2.6:7.4 (weight ratio). The evaluation results of the flame retardancy of the test piece with this mixing ratio are shown in Table 3.

According to the results of Tests 12 to 15, when MgO and $SiO_2$ were used in a merely mixed form, not a complex oxide form (or the binded form), the flame retardancy is not sufficiently conferred to any of the PLA-PBS resin, the PLA resin, the PS resin and the HIPS resin.

Test 16

Polylactic acid (PLA) which was synthesized from corn as a material and the silica-magnesia catalyst powder (MgO: 10.2 wt %) were kneaded and a mixing ratio of the silica-magnesia catalyst was determined which ratio was necessary for obtaining a flame-retardant resin composition which satisfied V0 according to the UL specification. The ratio of MgO in this catalyst is approximately half of that in the catalyst used in Test 2.

A blending sequence for the composition employed in this test is illustrated by a flow chart shown in FIG. 2. In this test, the polylactic acid (PLA) pellets and the silica-magnesia catalyst, as the flame-retardant component, which was previously activated by heating treatment were kneaded with the twin screw kneader at 185° C. (Step 1), and press-molded into a test piece of 125 mm×13 mm×3.2 mm (at a molding temperature of 180° C. under a pressure of 120 kg/cm$^2$) (Step 2). In this test, a plurality of test pieces were produced varying the mixing ratio of the pellet to the silica-magnesia catalyst and each piece was evaluated as to flame retardancy. The silica-magnesia catalyst was the same as that used in Test 1. The catalyst was not crushed by kneading and the powder retaining the initial size was dispersed in the resin. As a result of the evaluation, the mixing ratio of the PLA resin pellet to the silica-magnesia catalyst in the most flame-retardant test piece was 90:10 (weight ratio). The test piece with this mixing ratio was made and subjected to the UL-94 vertical flame test. The results are shown in Table 3 as the results of Test 16. As seen from these results, the test piece had the flame retardancy of V0, but the combustion time is longer than that of the test piece made in Test 2 wherein the mixing ratio of the catalyst was the same as that in this test. It is considered that this is because the ratio of MgO is small in the silica-magnesia catalyst.

Test 17

Polylactic acid (PLA) which was synthesized from corn as a material and the silica-magnesia catalyst powder (MgO: 48.5 wt %) were kneaded and a mixing ratio of the silica-magnesia catalyst was determined which ratio was necessary for obtaining a flame-retardant resin composition which satisfied V0 according to the UL specification. The ratio of MgO in this catalyst is approximately double that in the catalyst used in Test 2.

A blending sequence for the composition employed in this test is illustrated by a flow chart shown in FIG. 2. In this test, the polylactic acid (PLA) pellets and the silica-magnesia catalyst, as the flame-retardant component, which was previously activated by heating treatment were kneaded with the twin screw kneader at 185° C. (Step 1), and press-molded into a test piece of 125 mm×13 mm×3.2 mm (at a molding temperature of 180° C. under a pressure of 120 kg/cm$^2$) (Step 2). In this test, a plurality of test pieces were produced varying the mixing ratio of the pellet to the silica-magnesia catalyst and each piece was evaluated as to flame retardancy. The silica-magnesia catalyst was the same as that used in Test 1. The catalyst was not crushed by kneading and the powder retaining the initial size was dispersed in the resin. As a result of the evaluation, the mixing ratio of the PLA resin pellet to the silica-magnesia catalyst in the most flame-retardant test piece was 90:10 (weight ratio). The test piece with this mixing ratio was made and subjected to the UL-94 vertical flame test. The results are shown in Table 3 as the results of Test 17. As seen from these results, the test piece had the flame retardancy of V0, but the combustion time is approximately the same as that of the test piece made in Test 2 wherein the mixing ratio of the catalyst was the same as that in this test. It is considered that this means that even if much MgO is contained and the mixing ratio of MgO is over a certain level in the silica-magnesia catalyst, the effect of flame retardation is not changed.

Test 18

PS/PPE pellets wherein PS and polyphenylene ether were contained in an amount of 50 wt % respectively and the silica-magnesia catalyst powder (MgO: 24.5 wt %) were kneaded and a mixing ratio of the silica-magnesia catalyst was determined which ratio was necessary for obtaining a flame-retardant resin composition which satisfied V0 according to the UL specification.

A blending sequence for the composition employed in this test is illustrated by a flow chart shown in FIG. 2. In this test, the PS/PPE pellets and the silica-magnesia catalyst, as the flame-retardant component, which was previously activated by heating treatment were kneaded with the twin screw kneader at 245° C. (Step 1), and press-molded into a test piece of 125 mm×13 mm×3.2 mm (at a molding temperature of 240° C. under a pressure of 120 kg/cm$^2$) (Step 2). In this test, a plurality of test pieces were produced varying the mixing ratio of the pellet to the silica-magnesia catalyst and each piece was evaluated as to flame retardancy. The silica-magnesia catalyst was the same as that used in Test 1. The catalyst was not crushed by kneading and the powder retaining the initial size was dispersed in the resin. As a result of the evaluation, the mixing ratio of the PLA resin pellet to the silica-magnesia catalyst in the most flame-retardant test piece was required to be 90:10 (weight ratio) in order to achieve the flame retardancy V0 according to the UL specification. The results of the UL-94 vertical flame test for the test piece which contained the silica-magnesia catalyst in an amount of 10 wt % were shown in Table 3 as the results of Test 18.

TABLE 3

| Test Sample | Afterflame time | Total afterflame time for 5 samples | Afterflame time after second flame application | Afterflame or afterglow up to holding clamp | Cotton indicator ignited by flaming particles or drops | Rating |
|---|---|---|---|---|---|---|
| 1 | 7 sec | 45 sec | 13 sec | No | No | V0 |
| 2 | 7 sec | 44 sec | 14 sec | No | No | V0 |
| 3 | 9 sec | 45 sec | 13 sec | No | No | V0 |
| 4 | 9 sec | 43 sec | 12 sec | No | No | V0 |
| 5 | 7 sec | 40 sec | 11 sec | No | No | V0 |
| 6 | 8 sec | 42 sec | 13 sec | No | No | V0 |
| 7 | 7 sec | 44 sec | 15 sec | No | No | V0 |
| 8 | 6 sec | 40 sec | 11 sec | No | No | V0 |
| 9 | 7 sec | 45 sec | 15 sec | No | No | V0 |
| 10 | 7 sec | 45 sec | 13 sec | No | No | V0 |
| 11 | 8 sec | 45 sec | 15 sec | No | No | V0 |
| 12 | 21 sec | 65 sec | 32 sec | Burn out | Yes | Non flame retardant |
| 13 | 20 sec | 65 sec | 33 sec | Burn out | Yes | Non flame retardant |
| 14 | 22 sec | 63 sec | 32 sec | Burn out | Yes | Non flame retardant |
| 15 | 24 sec | 60 sec | 35 sec | Burn out | Yes | Non flame retardant |
| 16 | 10 sec | 50 sec | 21 sec | No | No | V0 |
| 17 | 7 sec | 43 sec | 14 sec | No | No | V0 |
| 18 | 8 sec | 45 sec | 15 sec | No | No | V0 |

In the above tests, the silica-magnesia catalyst which is a catalytic cracking catalyst is exemplified as the flame-retardant component. It was confirmed that almost the same effect was achieved by an $SiO_2/Al_2O_3$ catalyst, an $SiO_2/Al_2O_3/MgO$ catalyst and other catalysts.

Further, in the above tests, $La_2O_3$ and CeO are exemplified as the flame-retardant components which are used alone or applied to the $SiO_2$ porous material. It was confirmed that almost the same effect was achieved by SnO, CuO and other catalyst.

Industrial Applicability

The resin composition of the present invention is one wherein flame retardancy is conferred to a biodegradable resin and/or a plant-based resin which reduces the environmental load associated with procurement of materials and disposal after being used, and the composition is characterized in that the industrial practicability thereof is high. Further, the present invention is characterized in that the flame retardancy is conferred to the PS resin which has been made flame retardant using the halogen-based flame retarder in most cases, by the non-halogen-based flame retardancy-imparting component, and thereby the PS resin with reduced environmental load and high industrial value is obtained. Furthermore, since the flame retardancy-imparting component is a catalyst used in chemical industry, the resin composition of the present invention can be produced by recovering a spent catalyst used in, for example, catalytic cracking of hydrocarbon and using the spent catalyst. Therefore, the present invention has high industrial value from the viewpoint of recycling of the waste. The resin composition of present invention is thus suitable for constituting various articles and useful as a material constituting, particularly exterior bodies of electric appliances and so on.

The invention claimed is:

1. A method for producing an exterior body of an electric appliance, the method comprising steps of:
    kneading one or more resin components and one or more flame retardancy-imparting components to give a flame-retarded resin composition satisfying V0 according to the UL Specification, and
    molding the flame-retarded resin composition by an injection molding method or a compression molding method,
    wherein:
    polylactic acid or a lactic acid copolymer is contained at a ratio of 55 wt % or more of an entire resin component,
    at least one of the flame retardancy-imparting components to make the flame-retarded resin composition satisfy the V0 according to the UL Specification is a catalytic cracking catalyst and the catalytic cracking catalyst is a solid acid silica-magnesia catalyst, proportion of magnesium oxide in the silica-magnesia catalyst being from 10 wt % to 24.5 wt %,
    the catalytic cracking catalyst is activated by being heated, before the step of kneading,
    the at least one flame retardancy-imparting component is contained in an amount of 0.5 wt % to 40 wt % of the flame-retarded resin composition, and
    no metal hydroxide and no polyvinyl chloride are contained in the composition.

2. The method of claim 1, wherein the proportion of magnesium oxide in the silica-magnesia catalyst is 24.5 wt %.

* * * * *